United States Patent
Kobayashi et al.

(10) Patent No.: US 11,253,840 B2
(45) Date of Patent: Feb. 22, 2022

(54) TRANSITION METAL DOPED ALUMINA FOR IMPROVED TWC PERFORMANCE

(71) Applicant: JOHNSON MATTHEY PUBLIC LIMITED COMPANY, London (GB)

(72) Inventors: Masayuki Kobayashi, Tochigi (JP); Shuhei Nagaoka, Tochigi (JP)

(73) Assignee: Johnson Matthey Public Limited Company, London (GB)

( * ) Notice: Subject to any disclaimer, the term of this patent is extended or adjusted under 35 U.S.C. 154(b) by 101 days.

(21) Appl. No.: 16/710,009

(22) Filed: Dec. 11, 2019

(65) Prior Publication Data

US 2020/0188887 A1    Jun. 18, 2020

Related U.S. Application Data

(60) Provisional application No. 62/779,060, filed on Dec. 13, 2018.

(51) Int. Cl.
  *B01J 21/04* (2006.01)
  *B01J 21/06* (2006.01)
  (Continued)

(52) U.S. Cl.
  CPC .......... *B01J 23/464* (2013.01); *B01D 53/945* (2013.01); *B01J 23/02* (2013.01); *B01J 23/06* (2013.01); *B01J 23/10* (2013.01); *B01J 23/34* (2013.01); *B01J 23/44* (2013.01); *B01J 23/72* (2013.01); *B01J 23/745* (2013.01); *B01J 35/0006* (2013.01); *B01D 2255/1023* (2013.01); *B01D 2255/1025* (2013.01);
  (Continued)

(58) Field of Classification Search
  CPC .... B01D 2255/1023; B01D 2255/1025; B01D 2255/2042; B01D 2255/20707; B01D 2255/2073; B01D 2255/2076; B01D 2255/20792; B01D 2255/2092; B01D 2255/9022; B01D 2255/9025; B01D 2255/908; B01J 35/0006; B01J 23/02; B01J 23/06; B01J 23/10; B01J 23/34; B01J 23/44; B01J 23/464; B01J 23/72; B01J 23/745; B01J 21/04; B01J 23/40; B01J 23/42; B01J 23/46; B01J 23/58; B01J 23/63; B01J 23/6562; B01J 23/755; B01J 23/78; B01J 23/80; B01J 23/83; B01J 23/8892; B01J 23/8906; B01J 23/892; B01J 23/8926; B01J 23/894; B01J 23/8946; B01J 23/8953; B01J 23/8986; B01J 21/006; B01J 21/063; B01J 21/066
  USPC ........ 502/302–304, 328, 332–334, 339, 349, 502/355, 415, 439
  See application file for complete search history.

(56) References Cited

U.S. PATENT DOCUMENTS

3,899,444 A    8/1975  Stephens
4,448,895 A *  5/1984  Ono .................... B01D 53/945
                                                502/304
(Continued)

FOREIGN PATENT DOCUMENTS

CN    101590435 A    12/2009
JP    2007313493 A    12/2007
(Continued)

*Primary Examiner* — Cam N. Nguyen

(57) ABSTRACT

Catalyst compositions, articles, systems and methods related to a three-way-catalyst composition comprising alumina doped with a transition metal.

19 Claims, 2 Drawing Sheets

(51) Int. Cl.
*B01J 23/02* (2006.01)
*B01J 23/06* (2006.01)
*B01J 23/10* (2006.01)
*B01J 23/34* (2006.01)
*B01J 23/40* (2006.01)
*B01J 23/42* (2006.01)
*B01J 23/46* (2006.01)
*B01J 23/58* (2006.01)
*B01J 23/63* (2006.01)
*B01J 23/72* (2006.01)
*B01J 23/745* (2006.01)
*B01J 23/755* (2006.01)
*B01J 23/78* (2006.01)
*B01J 23/80* (2006.01)
*B01J 23/83* (2006.01)
*B01J 23/88* (2006.01)
*B01J 23/89* (2006.01)
*B01J 35/00* (2006.01)
*B01D 53/94* (2006.01)
*B01J 23/44* (2006.01)

(52) U.S. Cl.
CPC ............ *B01D 2255/2042* (2013.01); *B01D 2255/2073* (2013.01); *B01D 2255/2092* (2013.01); *B01D 2255/20707* (2013.01); *B01D 2255/20761* (2013.01); *B01D 2255/20792* (2013.01); *B01D 2255/908* (2013.01); *B01D 2255/9022* (2013.01); *B01D 2255/9025* (2013.01)

(56) References Cited

U.S. PATENT DOCUMENTS

| | | | | |
|---|---|---|---|---|
| 4,780,447 A * | 10/1988 | Kim | ............... | B01D 53/945 502/243 |
| 4,916,105 A * | 4/1990 | Rieck | ............... | B01J 23/894 502/303 |
| 4,921,829 A * | 5/1990 | Ozawa | ............... | B01J 23/8946 502/302 |
| 5,102,853 A * | 4/1992 | Chattha | ............... | B01D 53/945 502/333 |
| 5,179,053 A * | 1/1993 | Subramanian | ....... | B01D 53/945 502/65 |
| 5,185,305 A * | 2/1993 | Subramanian | ....... | B01J 35/0006 502/65 |
| 5,948,723 A * | 9/1999 | Sung | ............... | B01J 37/038 502/303 |
| 6,022,825 A * | 2/2000 | Andersen | ............ | B01D 53/945 502/303 |
| 6,835,689 B1 * | 12/2004 | He | ............... | C01G 55/00 502/302 |
| 6,921,738 B2 * | 7/2005 | Hwang | ............... | B01J 23/63 502/240 |
| 7,396,516 B2 * | 7/2008 | Fisher | ............... | B01J 23/34 423/213.2 |
| 7,585,811 B2 * | 9/2009 | Nakamura | ............... | B01J 37/03 502/327 |
| 7,713,911 B2 * | 5/2010 | Wakamatsu | ............ | B01J 37/031 502/332 |
| 8,506,912 B1 * | 8/2013 | Hepburn | ................ | B01D 53/56 423/213.2 |
| 8,507,404 B2 * | 8/2013 | El-Malki | ................ | F01N 3/0821 502/302 |
| 8,545,780 B1 * | 10/2013 | Chen | ............... | B01J 27/055 423/213.2 |
| 8,845,987 B1 * | 9/2014 | Nazarpoor | ............ | B01D 53/62 423/213.2 |
| 8,974,764 B2 * | 3/2015 | Ifrah | ............... | B01J 23/10 423/593.1 |
| 9,012,353 B2 * | 4/2015 | Golden | ................ | B01D 53/945 502/339 |
| 9,475,005 B2 * | 10/2016 | Hatfield | ............. | B01D 53/9472 |
| 9,527,034 B2 * | 12/2016 | Bergeal | ................ | B01J 37/0215 |
| 9,527,035 B2 * | 12/2016 | Bergeal | ................ | B01J 37/0215 |
| 10,279,314 B2 * | 5/2019 | Bergeal | ................ | B01D 53/944 |
| 10,753,248 B2 * | 8/2020 | Hirota | ................ | B01D 53/865 |
| 10,987,658 B2 * | 4/2021 | Camm | ................ | B01J 37/0215 |
| 2003/0066285 A1 | 4/2003 | Raybone et al. | | |
| 2003/0180196 A1 | 9/2003 | Gillespie et al. | | |
| 2011/0030346 A1 | 2/2011 | Neubauer et al. | | |
| 2012/0055141 A1 * | 3/2012 | Hilgendorff | ............. | B01J 23/63 60/301 |
| 2014/0322114 A1 * | 10/2014 | Jen | ............... | B01J 23/755 423/213.5 |
| 2019/0111389 A1 * | 4/2019 | Camm | ................ | B01D 53/945 |
| 2020/0030775 A1 * | 1/2020 | Kitamoto | ................ | B01J 23/464 |
| 2020/0030776 A1 * | 1/2020 | Jing | ............... | B01D 53/62 |

FOREIGN PATENT DOCUMENTS

| | | |
|---|---|---|
| KR | 20170091969 A | 8/2017 |
| RU | 2574404 C2 | 2/2016 |
| WO | 02040151 A1 | 5/2002 |
| WO | 2018167055 A1 | 9/2018 |

* cited by examiner

TRANSITION METAL DOPED ALUMINA FOR IMPROVED TWC PERFORMANCE

BACKGROUND OF THE INVENTION

Internal combustion engines produce exhaust gases containing a variety of pollutants, including hydrocarbons (HCs), carbon monoxide (CO), and nitrogen oxides ("$NO_x$"). Emission control systems, including exhaust gas catalysts, are widely utilized to reduce the amount of these pollutants emitted to atmosphere. A commonly used catalyst for gasoline engine applications is a three-way catalyst (TWC). TWCs perform three main functions: (1) oxidation of carbon monoxide (CO); (2) oxidation of unburnt hydrocarbons; and (3) reduction of $NO_x$ to $N_2$.

TWC catalysts typically perform best when a gasoline engine operates at or close to stoichiometric conditions (air/fuel ratio, $\lambda=1$). However, it is common for engines to operate on either side of $\lambda=1$ at various stages during an operating cycle, commonly referred to as "rich" conditions when $\lambda<1$, which corresponds to an exhaust gas having a low oxygen content, and "lean" conditions when $\lambda>1$, which corresponds to an exhaust gas having a high oxygen content. When the engine is running rich, for example during acceleration, the overall exhaust gas composition is not oxidative, but reducing in nature, and it is more difficult to carry out oxidation reactions on the catalyst surface. For this reason, TWCs have been developed to incorporate a component which stores oxygen during leaner periods of the operating cycle, and releases oxygen during richer periods of the operating cycle, thus extending the effective operating window. For such purposes, ceria-based (e.g., ceria-zirconia mixed oxides) materials are used in the vast majority of current commercial TWCs as oxygen storage components (OSC).

For mobile applications, such as cars and trucks, TWC catalysts are coated onto the walls of a substrate which is then integrated into an exhaust gas treatment system. Generally, increasing the amount of catalyst coated onto the substrate will increase catalytic activity of the systems. However, high catalyst washcoat loadings may cause backpressure and heat mass concerns. Therefore, in order to meet strong emissions targets with lower catalyst loadings, considerable efforts have been made to enhance the efficiency of the catalyst components, including the OSC material.

In our application WO 02/40151, we described TWC compositions including a manganese-containing OSC and at least one optionally doped alumina, wherein the alumina may be doped with a rare earth material, silicon, germanium, phosphorus, arsenic, calcium, strontium, and/or barium. This application discloses the benefits of using manganese-containing OSC's; specifically, including manganese as a free oxide gives superior oxygen storage properties than if present as a mixed oxide phase. It is noted that WO 02/40151 discloses the use of manganese-containing OSCs in combination with doped alumina, i.e., as two separate components.

Despite advances in TWC technology, there remains a need for improved catalytic converters for certain engine platforms that produce high conversion rates without increased washcoat loading. This invention solves these needs amongst others.

SUMMARY OF THE INVENTION

According to the present invention, a three-way-catalyst composition can include alumina doped with a transition metal. The transition metal may comprise, for example, Ti, Mn, Fe, Cu, Zn, Ni, or combinations thereof; or Mn, Cu, or combinations thereof. In some aspects, the transition metal is present in an amount of about 2 wt % to about 8 wt %, relative to the total weight of the doped alumina.

A three-way-catalyst may include a platinum group metal component. The platinum group metal component may include, for example, Pd, Rh, Pt, or combinations thereof.

In some aspects, the alumina is La-stabilized alumina.

In some aspects, the doped alumina is present in an amount of about 0.1 wt % to about 10 wt % of the three-way-catalyst composition.

In some aspects, a three-way-catalyst composition may include an oxygen storage component (OSC) material comprising, for example, cerium oxide, zirconium oxide, a ceria-zirconia mixed oxide, an alumina-ceria-zirconia mixed oxide, or combinations thereof.

In some aspects, a three-way-catalyst composition may include an alkali or alkali earth metal. A suitable alkali or alkali earth metal may include, for example, barium, strontium, or combinations thereof.

According to the present invention, a catalyst article for treating exhaust gas can include (a) a substrate; and (b) a three-way-catalyst composition as described herein.

According to the present invention, a catalyst article for treating exhaust gas can include (a) a substrate; and (b) a three-way-catalyst composition comprising alumina doped with a transition metal. In some aspects, the catalyst article includes a first layer and a second layer arranged such that the exhaust gas will contact the second layer before contacting the first layer, wherein the first layer comprises the three-way-catalyst composition comprising alumina doped with a transition metal. The catalyst article may further include a third layer, arranged such that the exhaust gas will contact the third layer before contacting the second layer.

According to the present invention, a method of treating an exhaust gas from an internal combustion engine can include contacting the exhaust gas with the catalyst article as described herein.

DETAILED DESCRIPTION OF THE INVENTION

Figure 1:
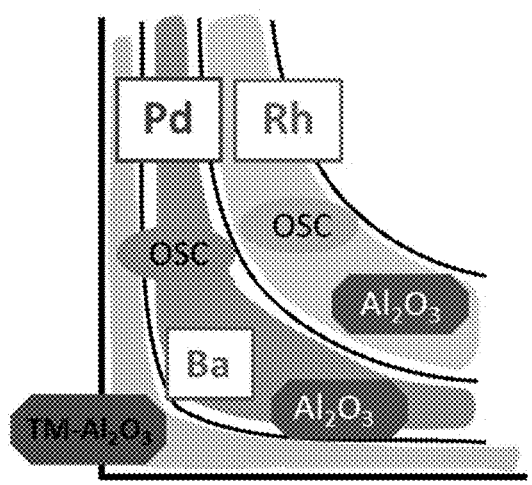
FIG. 1 shows a configuration of a catalyst article of the present invention.

The present invention is directed to the catalytic treatment of combustion exhaust gas, such as that produced by gasoline engines or other engines, and to related catalysts, catalytic articles, and systems. More specifically, the invention relates the simultaneous treatment of $NO_x$, CO, and HC in a vehicular exhaust system.

An important characteristic for three-way-catalysts is the ability to operate effectively over changing conditions of the exhaust gas, such as, for example, varying air-to-fuel ratios. A traditional response to this challenge has been the inclusion of Ce/Zr mixed oxide materials as an oxygen storage component. However, such catalysts' improvement in air-to-fuel ratio robustness may be limited by the adverse effects of increased washcoat loading, such as backpressure and heat mass.

While alumina materials have been used in three-way-catalysts as binder materials, it has surprisingly been found that when alumina materials are doped with transition metals, they can improve air-to-fuel robustness of the catalyst. Catalyst compositions including transition metal doped alumina, which are useful as three-way-catalysts to treat exhaust gas, are described in further detail herein.

Doped Alumina Component

Catalyst compositions of the present invention include transition metal doped alumina. In some aspects, a transition metal doped alumina of the present invention may act as and be used as an oxygen storage component, for example, in a TWC. Suitable types of alumina may include, for example, gamma-delta-, theta-, and alpha-alumina. Redox active transition metals may be doped onto alumina to provide the benefits discussed herein. In some aspects, suitable transition metals include Ti, Mn, Fe, Cu, Zn, Ni, or combinations thereof. In some aspects, suitable transition metals include Ti, Mn, Fe, Cu, Zn, or combinations thereof. In some aspects, suitable transition metals include Mn, Cu, or combinations thereof. A catalyst composition may include alumina doped with more than one transition metal. A catalyst composition may include a mixture or blend of different transition metal doped alumina. For example, a catalyst composition may include Cu-doped alumina and Mn-doped alumina; Cu-doped alumina and Ti-doped alumina; Cu-doped alumina and Fe-doped alumina; Cu-doped alumina and Zn-doped alumina; Cu-doped alumina and Ni-doped alumina; Mn-doped alumina and Ti-doped alumina; Mn-doped alumina and Fe-doped alumina; Mn-doped alumina and Zn-doped alumina; Mn-doped alumina and Ni-doped alumina; Fe-doped alumina and Ni-doped alumina; Fe-doped alumina and Ti-doped alumina; Fe-doped alumina and Zn-doped alumina; Zn-doped alumina and Ni-doped alumina; and/or Ni-doped alumina and Ti-doped alumina. In some aspects, the alumina is doped with transition metal in an amount of about 0.5 wt % to about 10 wt %; about 2 wt % to about 8 wt %; about 3 wt % to about 7 wt %; about 4 wt % to about 6 wt %; about 2 wt % to about 6 wt %; less than 10 wt %; less than 8 wt %; less than 6 wt %; less than 5 wt %; greater than 1 wt %; greater than 2 wt %; greater than 3 wt %; greater than 4 wt %; about 1 wt %; about 2 wt %; about 3 wt %; about 4 wt %; about 5 wt %; about 6 wt %; about 7 wt %; about 8 wt %; about 9 wt %; or about 10 wt %, relative to the total weight of the doped alumina. It understood in the art that transition metal doped alumina is distinct, chemically and physically, from a transition metal/ aluminium mixed oxide (e.g., $MnAlO_4$).

In some aspects, the transition metals may be doped onto La-stabilized alumina. The alumina may include, for example, La in an amount of about 0.5 wt % to about 10 wt %; about 1 wt % to about 8 wt %; about 2 wt % to about 6 wt %; about 3 wt % to about 5 wt %; about 2 wt % to about 5 wt %; less than 10 wt %; less than 8 wt %; less than 6 wt %; less than 5 wt %; less than 4 wt %; greater than 0.5 wt %; greater than 1 wt %; greater than 2 wt %; greater than 3 wt %; greater than 4 wt %; about 1 wt %; about 2 wt %; about 3 wt %; about 4 wt %; about 5 wt %; about 6 wt %; about 7 wt %; about 8 wt %; about 9 wt %; or about 10 wt %.

Transition metal doped alumina may be included in a catalyst composition in any suitable amount, based on the specific targets and context. In some aspects, a catalyst composition includes transition metal doped alumina in an amount of about 0.1 wt % to about 10 wt %; about 0.1 wt % to about 8 wt %; about 0.1 wt % to about 6 wt %; about 0.1 wt % to about 4 wt %; about 0.1 wt % to about 2 wt %; about 0.1 wt % to about 1 wt %; about 0.2 wt % to about 0.8 wt %; about 0.3 wt % to about 0.5 wt %; less than 10 wt %; less than 8 wt %; less than 6 wt %; less than 4 wt %; less than 2 wt %; less than 1 wt %; greater than 0.1 wt %; greater than 0.2 wt %; greater than 0.3 wt %; greater than 0.5 wt %; greater than 1 wt %; greater than 2 wt %; greater than 4 wt %; greater than 6 wt %; about 0.1 wt %; about 0.2 wt %; about 0.3 wt %; about 0.4 wt %; about 0.5 wt %; about 0.6 wt %; about 0.7 wt %; about 0.8 wt %; about 0.9 wt %; about 1 wt %; about 2 wt %; about 3 wt %; about 4 wt %; about 5 wt %; about 6 wt %; about 8 wt %; or about 10 wt %.

Preparation

The doped alumina of the present invention may be prepared by any suitable means known in the art. For instance, transition metal doped alumina may be prepared by co-precipitation using a alumina/La precursor with an aqueous solution of the corresponding metal nitrate salt (i.e. Ti, Mn, Fe, Cu, Zn, Ni), e.g., $Mn(NO_3)_2$. The co-precipitation may be followed by drying, for example drying at 150° C. for about 2 hours, and calcination, for example calcination at 500° C. for about 30 minutes.

Benefits

It has surprisingly been found that when alumina is doped with one or more transition metals, it can improve air-to-fuel robustness of the catalyst, meaning that the catalyst maintains effectiveness over varying air-to-fuel ratios. Catalyst compositions of the present invention may provide improved air-to-fuel robustness due to good low temperature oxygen storage capacity performance associated with the transition metal doped alumina. A catalyst composition including transition metal doped alumina may provide improved air-to-fuel ratio robustness as compared to a catalyst composition having the same formulation but without the alumina doped with transition metal. A catalyst composition including transition metal doped alumina may provide improved oxygen storage capacity performance as compared to a catalyst composition having the same formulation but without the alumina doped with transition metal. As used herein, oxygen storage capacity may be determined by the amount of CO consumption of the composition. In some aspects, the improved performance associated with the transition metal doped alumina is demonstrated at low exhaust gas temperatures, such as about 200° C. to about 400° C.; about 250° C. to about 350° C.; about 275° C. to about 325° C.; or about 300° C.

In some aspects, a catalyst composition including transition metal doped alumina may provide improved oxygen storage capacity performance at 300° C. as compared to a catalyst composition having the same formulation but without the alumina doped with transition metal, where the improvement is about 25 to about 700%; about 40% to about 690%; about 40% to about 650%; about 40% to about 600%; about 40% to about 550%; about 40% to about 500%; about 40% to about 400%; about 40% to about 300%; about 40% to about 200%; about 40% to about 150%; about 40% to about 100%; about 25% to about 50%; about 40% to about 100%; about 50% to about 100%; about 100% to about 150%; about 150% to about 200%; about 200% to about 250%; about 250% to about 300%; about 300% to about 350%; about 350% to about 400%; about 400% to about 450%; about 450% to about 500%; about 500% to about 550%; about 550% to about 600%; about 600% to about 650%; about 650% to about 690%; about 650% to about 700%; greater than 25%; greater than 40%; greater than 50%; greater than 75%; greater than 100%; greater than 150%; greater than 200%; greater than 250%; greater than 300%; greater than 350%; greater than 400%; greater than 450%; greater than 500%; greater than 550%; greater than 600%; or greater than 650%.

Furthermore, it has been discovered that the transition metal doped alumina not only provides the oxygen storage component function and associated air-to-fuel ratio robustness, but may also maintain the other beneficial properties of alumina such as high specific surface area and the lack of negative interaction with platinum group metals.

OSC Material

The catalyst composition can further comprise an oxygen storage capacity (OSC) material which is separate from the transition metal dope alumina, and/or an alkali or alkali earth metal component.

The OSC material is preferably selected from the group consisting of cerium oxide, zirconium oxide, a ceria-zirconia mixed oxide, and an alumina-ceria-zirconia mixed oxide. More preferably, the OSC material comprises the ceria-zirconia mixed oxide. The ceria-zirconia mixed oxide can further comprise some dopants, such as, La, Nd, Y, Pr, etc.

The ceria-zirconia mixed oxide can have a molar ratio of zirconia to ceria at least 50:50, preferably, higher than 60:40, more preferably, higher than 75:25. In addition, the OSC material may function as a support material for a PGM component.

The OSC material (e.g., ceria-zirconia mixed oxide) can be from 10 to 90 wt %, preferably, 25-75 wt %, more preferably, 35-65 wt %, based on the total weight of the catalyst composition.

In some aspects, the OSC material and the transition metal doped alumina can have a weight ratio of no greater than 10:1; no greater than 8:1 or 5:1; no greater than 4:1 or 3:1; or no greater than 2:1.

Alternatively, the OSC material and the transition metal doped alumina can have a weight ratio of 10:1 to 1:10; 8:1 to 1:8; 5:1 to 1:5; 4:1 to 1:4; 3:1 to 1:3; or 2:1 to 1:2.

In some aspects, the alkali or alkali earth metal may be deposited on the OSC material.

The alkali or alkali earth metal may comprise, for example, barium or strontium. In some aspects, the barium or strontium, where present, is present in an amount of about 0.1 wt % to about 15 wt %; or about 3 wt % to about 10 wt %, based on the total weight of the catalyst composition.

In some aspects, the barium is present as a $BaCO_3$ composite material or as $Ba(OH)_2$. A $BaCO_3$ composite material can be performed by any method known in the art, for example incipient wetness impregnation or spray-drying.

PGM Component

Catalyst compositions of the present invention may also include a platinum group metal (PGM) component. In some aspects, the PGM component includes Pd, Rh, Pt, or combinations thereof. In some aspects, the PGM component includes Pd, Rh, or combinations thereof. In some aspects, the PGM component is Pd.

The catalyst composition can comprise a PGM component in an amount of up to 20 wt %; about 0.05 wt % to about 10 wt %, or about 0.2 wt % to about 5 wt % of the catalyst composition.

Further Components

Catalyst compositions of the present invention may comprise further components that are known to the skilled person. For example, the compositions of the invention may further comprise at least one binder and/or at least one surfactant. In some aspects, the catalyst may comprise a binder in addition to the transition metal doped alumina.

Substrate

Catalyst articles of the present invention may include a catalyst composition as described herein and a substrate. Catalyst compositions may be applied to a substrate by any known means, including application of a washcoat. Suitable substrates may include is a flow-through monolith, or wall flow gasoline particulate filter. Preferably, the substrate is a flow-through monolith.

A flow-through monolith substrate may have a first face and a second face defining a longitudinal direction there between. The flow-through monolith substrate has a plurality of channels extending between the first face and the second face. The plurality of channels extend in the longitudinal direction and provide a plurality of inner surfaces (e.g. the surfaces of the walls defining each channel). Each of the plurality of channels has an opening at the first face and an opening at the second face. For the avoidance of doubt, the flow-through monolith substrate is not a wall flow filter.

The first face is typically at an inlet end of the substrate and the second face is at an outlet end of the substrate.

The channels may be of a constant width and each plurality of channels may have a uniform channel width.

Preferably within a plane orthogonal to the longitudinal direction, the monolith substrate has from 100 to 900 channels per square inch, preferably from 300 to 750. For example, on the first face, the density of open first channels and closed second channels is from 300 to 750 channels per square inch. The channels can have cross sections that are rectangular, square, circular, oval, triangular, hexagonal, or other polygonal shapes.

The monolith substrate acts as a support for holding catalytic material. Suitable materials for forming the monolith substrate include ceramic-like materials such as cordierite, silicon carbide, silicon nitride, zirconia, mullite, spodumene, alumina-silica magnesia or zirconium silicate, or of porous, refractory metal. Such materials and their use in the manufacture of porous monolith substrates is well known in the art.

It should be noted that the flow-through monolith substrate described herein is a single component (i.e. a single brick). Nonetheless, when forming an emission treatment system, the monolith used may be formed by adhering together a plurality of channels or by adhering together a plurality of smaller monoliths as described herein. Such techniques are well known in the art, as well as suitable casings and configurations of the emission treatment system.

In aspects wherein the catalyst article of the present comprises a ceramic substrate, the ceramic substrate may be made of any suitable refractory material, e.g., alumina, silica, titania, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. Cordierite, a magnesium aluminosilicate, and silicon carbide are particularly preferred.

In aspects wherein the catalyst article of the present invention comprises a metallic substrate, the metallic substrate may be made of any suitable metal, and in particular heat-resistant metals and metal alloys such as titanium and stainless steel as well as ferritic alloys containing iron, nickel, chromium, and/or aluminum in addition to other trace metals.

In some aspects, the catalyst composition is supported/deposited directly on the substrate.

Configurations

A catalyst article of the present invention may include a substrate with one or more layers of catalyst composition. In some aspects, a catalyst article may include a substrate having a first layer which is supported/deposited directly on the substrate, the first layer including a transition metal doped alumina. In some aspects, the catalyst article includes only this first layer. In some aspects, the first layer may also include additional components as described herein, such as an OSC material, an alkali or alkali earth metal component, and/or a PGM component. In some aspects, the first layer includes a transition metal doped alumina but does not include an OSC material, an alkali or alkali earth metal component, and/or a PGM component.

In some aspects, a catalyst article may include one or more layers in addition to the first layer. The one or more additional layers may be adjacent to and/or cover the first layer, either partially or completely. In some aspects, a catalyst article includes a first layer and a second layer arranged such that the exhaust gas will contact the second layer before contacting the first layer. In some aspects, a catalyst article further includes a third layer, arranged such that the exhaust gas will contact the third layer prior to contacting the second or first layers. In some aspects, the one or more additional layers may include a three-way-catalyst composition or other catalyst compositions as desired. Where the one or more additional layers include a three-way-catalyst composition, such composition may include, for example, a transition metal doped alumina, OSC material, an alkali or alkali earth metal component, and/or a PGM component.

In a particular embodiment, a catalyst article is configured as shown in FIG. 1. FIG. 1 shows a first layer including transition metal doped alumina; a second layer including alumina, an OSC material, a PGM component (Pd), and an alkali or alkali earth metal component (Ba); and a third layer including a PGM component (Rh), an OSC material, and alumina.

As used herein, the term "catalyst composition" may be understood to mean a single layer of catalyst composition, or may refer collectively to a catalyst composition that is configured as multiple layers.

Methods and Systems

Another aspect of the present disclosure is directed to a method for treating a vehicular exhaust gas containing $NO_x$, CO, and HC using the catalyst article described herein. A method of treating a vehicular exhaust gas containing $NO_x$, CO, and HC may include contacting an exhaust gas with a catalyst composition comprising a transition metal doped alumina as described herein. In some aspects, the exhaust gas temperatures is at a temperature of about 200° C. to about 400° C.; about 250° C. to about 350° C.; about 275° C. to about 325° C.; or about 300° C. Catalytic converters equipped with a catalyst composition of the present invention may provide improved catalytic performance compared to conventional three-way-catalysts which do not contain a transition metal doped alumina.

Another aspect of the present disclosure is directed to a system for treating vehicular exhaust gas comprising the catalyst article described herein in conjunction with a conduit for transferring the exhaust gas through the system.

Terms

The term "washcoat" is well known in the art and refers to an adherent coating that is applied to a substrate usually during production of a catalyst.

The acronym "PGM" as used herein refers to "platinum group metal". The term "platinum group metal" generally refers to a metal selected from the group consisting of Ru, Rh, Pd, Os, Ir and Pt, preferably a metal selected from the group consisting of Ru, Rh, Pd, Ir and Pt. In general, the term "PGM" preferably refers to a metal selected from the group consisting of Rh, Pt and Pd.

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The expression "substantially free of" as used herein with reference to a material, typically in the context of the content of a region, a layer or a zone, means that the material in a minor amount, such as ≤5% by weight, preferably ≤2% by weight, more preferably ≤1% by weight. The expression "substantially free of" embraces the expression "does not comprise."

The expression "essentially free of" as used herein with reference to a material, typically in the context of the content of a region, a layer or a zone, means that the material in a trace amount, such as ≤1% by weight, preferably ≤0.5% by weight, more preferably ≤0.1% by weight. The expression "essentially free of" embraces the expression "does not comprise."

Any reference to an amount of dopant, particularly a total amount, expressed as a % by weight as used herein refers to the weight of the support material or the refractory metal oxide thereof.

The term "loading" as used herein refers to a measurement in units of $g/ft^3$ on a metal weight basis.

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

It is to be appreciated that certain features of the invention which are, for clarity, described herein in the context of separate embodiments or aspects, may also be provided in combination in a single embodiment or aspect. That is, unless obviously incompatible or specifically excluded, each individual embodiment is deemed to be combinable with any other embodiment(s) or aspect(s) and such a combination is considered to be another embodiment. Conversely, various features of the invention that are, for brevity, described in the context of a single embodiment or aspect, may also be provided separately or in any sub-combination. Finally, while an embodiment or aspect may be described as part of a series of steps or part of a more general structure, each said step may also be considered an independent embodiment aspect in itself, combinable with others.

The transitional terms "comprising," "consisting essentially of," and "consisting" are intended to connote their generally accepted meanings in the patent vernacular; that is, (i) "comprising," which is synonymous with "including," "containing," or "characterized by," is inclusive or open-ended and does not exclude additional, unrecited elements or method steps; (ii) "consisting of" excludes any element, step, or ingredient not specified in the claim; and (iii) "consisting essentially of" limits the scope of a claim to the specified materials or steps "and those that do not materially affect the basic and novel characteristic(s)" of the claimed invention. Embodiments described in terms of the phrase "comprising" (or its equivalents), also provide, as embodiments, those which are independently described in terms of "consisting of" and "consisting essentially" of. For those embodiments provided in terms of "consisting essentially of," the basic and novel characteristic(s) is the ability of the catalyst compositions to simultaneously treat $NO_x$, CO, and HC in a vehicular exhaust system efficiently, with air-to-fuel ratio robustness. Materials or steps which do not detract from such operability would be considered within the scope of such embodiments.

When a list is presented, unless stated otherwise, it is to be understood that each individual element of that list, and every combination of that list, is a separate embodiment. For example, a list of embodiments or aspects presented as "A, B, or C" is to be interpreted as including the embodiments, "A," "B," "C," "A or B," "A or C," "B or C," or "A, B, or C."

Throughout this specification, words are to be afforded their normal meaning, as would be understood by those skilled in the relevant art. However, so as to avoid misunderstanding, the meanings of certain terms will be specifically defined or clarified.

"Optional" or "optionally" means that the subsequently described circumstance may or may not occur, so that the description includes instances where the circumstance occurs and instances where it does not. Similarly, embodiments which refer to a component or step as being "optionally present," those embodiments include separate independent embodiments in which the step or component is present or absent. The description "optional" allows for, but does not require, the optional condition to occur.

The following examples merely illustrate the invention. Those skilled in the art will recognize many variations that are within the spirit of the invention and scope of the claims.

EXAMPLES

Materials

All materials are commercially available and were obtained from known suppliers, unless noted otherwise.

Example 1

Catalyst articles were prepared by coating a cordierite substrate with catalyst composition. The catalyst composition includes 3 wt % Pd supported alumina/OSC material with the content of Ba=4.5 wt %.

Catalyst articles were prepared with formulation above, containing the following alumina components:

1. Conventional alumina
2. Ti-doped alumina
3. Mn-doped alumina
4. Cu-doped alumina
5. Zn-doped alumina OSC performance testing was performed on each of the catalyst articles, by contacting the catalyst with a gas stream including CO and $O_2$ gas as shown in Table 1.

TABLE 1

Gas Composition for the OSC Test

| | CO (%) | $O_2$ (%) | $N_2$ |
|---|---|---|---|
| Reductive gas | 1.0 | 0.0 | Balance |
| Oxidative gas | 0.0 | 0.5 | Balance |

In the OSC test, 1 vol % CO gas and 0.5 vol % $O_2$ gas were alternately passed through a catalyst core sample, and the amount of oxygen storage capacity was estimated by calculation of the amount of CO consumption at 300° C.

Figure 2:
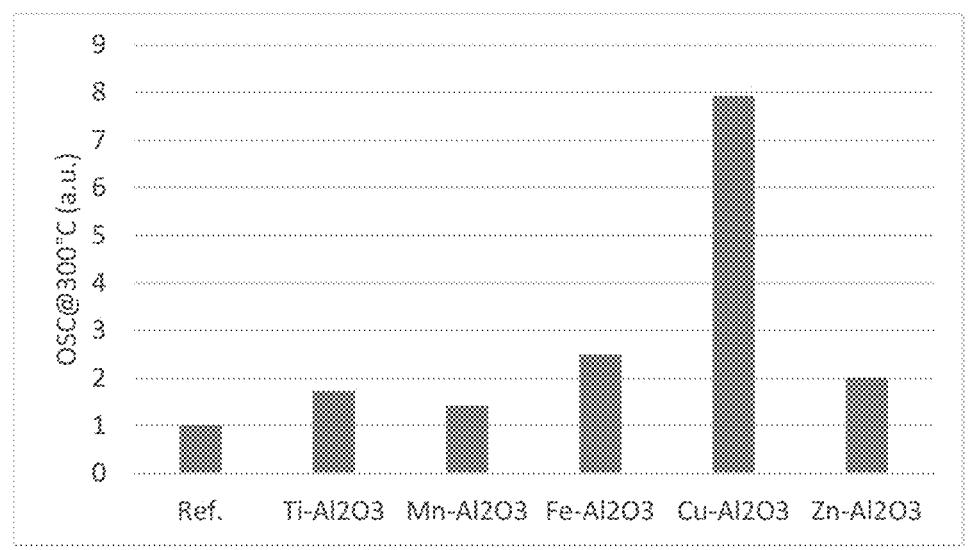
FIG. 2 shows OSC performance of inventive and reference catalysts.

As shown in FIG. 2, significant improvement of the OSC performance at 300° C. was found for the tested transition metal element doped alumina system when compared to the catalyst containing the conventional alumina. Improvement in OSC performance at 300° C. ranged from 40% to 690% over the conventional alumina catalyst.

Example 2

Catalyst 1 (Comparative)

Catalyst 1 is a three-way (Pd—Rh) catalyst with a double-layered structure. The bottom layer consists of Pd supported on a washcoat of a first CeZr mixed oxide, La-stabilized alumina, Ba promotor. The washcoat loading of the bottom layer was about 2.0 g/in$^3$ with a Pd loading of 160 g/ft$^3$. The top layer consists of Rh supported on a washcoat of a second CeZr mixed oxide, La-stabilized alumina. The washcoat lading of the top layer was about 2.0 g/in$^3$ with a Rh loading of 26 g/ft$^3$. The total washcoat loading of Catalyst 1 was about 4.0 g/in$^3$.

Catalyst 2

Catalyst 2 is a three-way (Pd—Rh) catalyst with a triple-layered structure. The bottom layer includes TM-doped alumina. In Catalyst 2a, the TM-doped alumina is Fe-doped alumina with 8 wt % Fe. In Catalyst 2b, the TM-doped alumina is Mn-doped alumina with 8 wt % Mn. The washcoat loading of the bottom layer is about 1.0 g/in$^3$. The middle layer includes Pd supported on a washcoat of a first CeZr mixed oxide, La-stabilized alumina, Ba promotor. The washcoat loading of the bottom layer is about 2.0 g/in$^3$ with a Pd loading of 160 g/ft$^3$. The top layer consists of Rh supported on a washcoat of a second CeZr mixed oxide, La-stabilized alumina. The washcoat lading of the top layer is about 2.0 g/in$^3$ with a Rh loading of 26 g/ft$^3$. The total washcoat loading of Catalyst 2 is about 4.0 g/in$^3$.

Comparative Catalyst 1 and Catalysts 2 were bench aged for 75 hours with fuel cut aging cycles, with peak temperature at 950° C. vehicle emissions were conducted over a commercial vehicle with 1.5 litre engine. Emissions were measured pre- and post-catalyst.

TABLE 2

Catalysts Performance by Bag Emission Analysis

| | Weighted Tailpipe Emissions (g/mile) | |
|---|---|---|
| | HC | $NO_x$ |
| Comparative Catalyst 1 | 0.035 | 0.035 |
| Catalyst 2a having Fe—$Al_2O_3$ layer | 0.031 | 0.033 |
| Catalyst 2b having Mn—$Al_2O_3$ layer | 0.024 | 0.027 |

As shown in Table 2, Catalysts 2 showed significant reduction of emission of HC and $NO_x$ in comparison with Comparative Catalyst 1.

We claim:

1. A three-way-catalyst composition comprising alumina doped with a transition metal, wherein the transition metal comprises Ti, Mn, Fe, Cu, Zn, Ni, or combinations thereof; and wherein the transition metal is present in an amount of about 2 wt % to about 8 wt %, relative to the total weight of the doped alumina.

2. The three-way-catalyst composition of claim 1, wherein the transition metal comprises Mn, Cu, or combinations thereof.

3. The three-way-catalyst composition of claim 1, comprising a platinum group metal component.

4. The three-way-catalyst composition of claim 3, wherein the platinum group metal component comprises Pd, Rh, Pt, or combinations thereof.

5. The three-way-catalyst composition of claim 1, wherein the alumina is La-stabilized alumina.

6. The three-way-catalyst composition of claim 1, wherein the alumina is present in an amount of about 0.1 wt % to about 10 wt % of the three-way-catalyst composition.

7. The three-way-catalyst composition of claim 1, further comprising an oxygen storage component (OSC) material.

8. The three-way-catalyst composition of claim 7, wherein the OSC comprises cerium oxide, zirconium oxide, a ceria-zirconia mixed oxide, an alumina-ceria-zirconia mixed oxide, or combinations thereof.

9. The three-way-catalyst composition of claim 1, further comprising an alkali or alkaline-earth metal.

10. The three-way-catalyst composition of claim 9, wherein the alkali or alkaline-earth metal comprises barium, strontium, or combinations thereof.

11. A three-way-catalyst composition comprising alumina doped with a transition metal, wherein the transition metal comprises Ti, Mn, Fe, Cu, Zn, Ni, or combinations thereof; and wherein the alumina is present in an amount of about 0.1 wt % to about 10 wt % of the three-way-catalyst composition.

12. The three-way-catalyst composition of claim 11, wherein the transition metal comprises Mn, Cu, or combinations thereof.

13. The three-way-catalyst composition of claim 11, comprising a platinum group metal component.

14. The three-way-catalyst composition of claim 13, wherein the platinum group metal component comprises Pd, Rh, Pt, or combinations thereof.

15. The three-way-catalyst composition of claim 11, wherein the alumina is La-stabilized alumina.

16. The three-way-catalyst composition of claim 11, further comprising an oxygen storage component (OSC) material.

17. The three-way-catalyst composition of claim 16, wherein the OSC comprises cerium oxide, zirconium oxide, a ceria-zirconia mixed oxide, an alumina-ceria-zirconia mixed oxide, or combinations thereof.

18. The three-way-catalyst composition of claim 11, further comprising an alkali or alkaline-earth metal.

19. The three-way-catalyst composition of claim 18, wherein the alkali or alkaline-earth metal comprises barium, strontium, or combinations thereof.

* * * * *